United States Patent
Ishida et al.

(10) Patent No.: US 9,217,523 B2
(45) Date of Patent: Dec. 22, 2015

(54) CONNECTING STRUCTURE FOR TUBE

(75) Inventors: Kazuhisa Ishida, Aichi-ken (JP); Tetsuji Kato, Aichi-ken (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 483 days.

(21) Appl. No.: 12/461,881

(22) Filed: Aug. 27, 2009

(65) Prior Publication Data
US 2010/0052314 A1    Mar. 4, 2010

(30) Foreign Application Priority Data

Aug. 28, 2008  (JP) ................................. 2008-219227
Jul. 15, 2009  (JP) ................................. 2009-166740

(51) Int. Cl.
*F16L 13/007*    (2006.01)
*F16L 13/14*    (2006.01)

(52) U.S. Cl.
CPC ............. *F16L 13/143* (2013.01); *F16L 13/007* (2013.01)

(58) Field of Classification Search
CPC ......... F16L 37/04; F16L 37/08; F16L 37/091; F16L 21/035; F16L 33/18; F16L 33/22; F16L 13/143; F16L 13/007
USPC ............... 285/148.3, 148.12, 148.13, 148.22, 285/148.24, 233, 347, 348, 379, 334.5
See application file for complete search history.

(56) References Cited

U.S. PATENT DOCUMENTS

| | | | |
|---|---|---|---|
| 5,921,592 A * | 7/1999 | Donnelly | 285/340 |
| 6,106,029 A * | 8/2000 | DeMore et al. | 285/322 |
| 6,260,851 B1 | 7/2001 | Baron | |
| 7,198,078 B2 * | 4/2007 | Miura et al. | 141/286 |
| 2004/0066034 A1 | 4/2004 | Takayanagi et al. | |
| 2007/0090644 A1 * | 4/2007 | Poirier et al. | 285/239 |
| 2007/0108765 A1 * | 5/2007 | Hayakawa | 285/347 |
| 2008/0217917 A1 * | 9/2008 | Chiu | 285/354 |

FOREIGN PATENT DOCUMENTS

| | | |
|---|---|---|
| JP | A-H06-137476 | 5/1994 |
| JP | A-H08-121666 | 5/1996 |
| JP | A-H11-344181 | 12/1999 |
| JP | A-2000-136892 | 5/2000 |

(Continued)

OTHER PUBLICATIONS

Office Action dated Jan. 11, 2013 in corresponding JP Application No. 2009-166740 (and English translation).

*Primary Examiner* — Daniel P Stodola
*Assistant Examiner* — James Linford
(74) *Attorney, Agent, or Firm* — Posz Law Group, PLC

(57) ABSTRACT

An oil feeding device includes a tube body formed of metal and having a tube connecting part, and a connection pipe formed of resin and having a pipe connecting end. A press-fitting member and a seal member are clamped between the tube connecting part and the pipe connecting end. The press-fitting member includes a press-fitting body having a cylindrical outer peripheral face, which is fitted to an outer periphery of the tube connecting part, and claws which are formed at one end of the press-fitting body. The pipe connecting end is provided with a reduced diameter part which is formed by annularly reducing a diameter of a part of the pipe connecting end. The reduced diameter part retains the pipe connecting end, in engagement with the claws, by being formed by plastic deformation before or after the pipe connecting end is connected to the tube connecting part.

10 Claims, 9 Drawing Sheets

(56) References Cited

FOREIGN PATENT DOCUMENTS

| JP | A-2000-509465 | 7/2000 |
| JP | A-2003-247684 | 9/2003 |
| JP | A-2003-314775 | 11/2003 |
| JP | A-2004-156712 | 6/2004 |
| JP | B-3970633 | 6/2007 |
| JP | A-2009-085345 | 4/2009 |
| JP | A-2009-264507 | 11/2009 |

* cited by examiner

CONNECTING STRUCTURE FOR TUBE

BACKGROUND OF THE INVENTION

1. Field of the Invention

The present invention relates to a connecting structure for a tube for feeding fuel through a connection pipe formed of resin which is connected to a tube body formed of metal.

2. Related Art

Conventionally, as a connecting structure for a tube, there has been known an art for connecting a pipe formed of resin to a tube formed of metal, as disclosed in Japanese Patent No. 3970633. Specifically, a press-fitting member formed of resin and having an annular ridge is interposed between the tube formed of metal and the pipe formed of resin, and the annular ridge is allowed to be pressed into an inner wall of the pipe formed of resin thereby to retain the pipe formed of resin.

However, in case where the resin pipe is formed of material having insufficient elasticity, there has been such a problem that the annular ridge is insufficiently pressed into the inner wall of the resin pipe, and hence, a withdrawing load cannot be increased.

SUMMARY OF THE INVENTION

The invention has been made in order to solve the conventional technical problem as described above, and it is an object of the invention to provide a connecting structure for a tube which is excellent in sealing performance and retaining performance, in connecting a connection pipe formed of resin to a tube formed of metal.

The invention has been made in order to solve at least a part of the above described problems, and can be realized as the following embodiments or application examples.

According to the first aspect of the invention, there is provided a connecting structure for a tube comprising a tube body formed of metal and having a tube connecting part, and a connection pipe formed of resin and having a pipe connecting end which is connected to the tube connecting part by being inserted so as to cover the tube connecting part, wherein the connecting structure includes a press-fitting member in a tubular shape which is formed of resin and clamped between the tube connecting part and the pipe connecting end, and a seal member which is positioned at one end of the press-fitting member and interposed between the pipe connecting end and the tube connecting part for sealing, the press-fitting member includes a press-fitting body having a cylindrical outer peripheral face which is fitted to an outer peripheral part of the tube connecting part, and claws which are formed at one end of the press-fitting body, and the pipe connecting end is provided with a reduced diameter part which is formed by annularly reducing a diameter of a part of the pipe connecting end by plastic deformation, the reduced diameter part being so formed as to retain the pipe connecting end in engagement with the claws.

In the connecting structure for a tube as described in the first aspect of the invention, because the pipe connecting end of the connection pipe covers the tube connecting part of the tube body, and at the same time, the press-fitting member and the seal member are clamped between them, the connection pipe is connected to the tube connecting part with high sealing performance. The seal member is positioned at one end of the press-fitting member, and at the same time, clamped between the tube connecting part and the connection pipe, whereby the above described high sealing performance is realized.

Moreover, the claws of the press-fitting member are engaged with the reduced diameter part which is formed by reducing the diameter of a part of the pipe connecting end thereby to retain the pipe connecting end. Therefore, a large retaining load can be obtained, even though soft resin material is not employed as resin material for the connection pipe, as described in the prior art. As the results, various resin materials can be applied to the connection pipe, and versatility can be enhanced.

A state of engagement between the reduced diameter part of the pipe connecting end and the claws of the press-fitting member can be varied, by adequately modifying their shapes, specifically, by changing an angle of the claws to be butted against the reduced diameter part, or a size of the claws. In this manner, it is possible to easily set the retaining load at an optimal value.

The outer peripheral face of the press-fitting body of the press-fitting member is a smooth face in a cylindrical shape, and a large force is not required for the connection pipe to overstride the annular ridge, unlike the annular ridge having an acute angle which is formed on the outer peripheral part of the connection member as described in the prior art. In this manner, connecting workability is enhanced.

Moreover, the reduced diameter part which is formed at the pipe connecting end can be easily formed by crimping with heat or extrusion molding before connection, or by caulking with heat from the outer peripheral part of the pipe connecting end after the connection.

The claws in the second aspect of the invention are formed separately at a plurality of positions in a circumferential direction of the press-fitting member and pressed into an inner wall of the reduced diameter part thereby to restrain the pipe connecting end from rotating. Specifically, the claws may be formed over the entire circumference of the press-fitting member, or may be formed separately at a plurality of positions in the circumferential direction. In case where the claws are formed separately at a plurality of positions, the claws are pressed into the reduced diameter part thereby to function also as a rotation detent of the pipe connecting end, and hence, deterioration of sealing performance due to relative rotation of the tube body and the pipe connecting end will not occur.

The press-fitting member in the third aspect of the invention is formed by assembling divided bodies having a semi-circular sectional shape which are divided in an axial direction of the press-fitting member. According to this structure, the press-fitting member can be easily fitted to the tube connecting part, even though the ridge is formed on the outer peripheral part of the tube connecting part.

In the fourth aspect of the invention, one end of the seal member is positioned in an end part of the tube connecting part, and an annular ridge for sealing having an inclined face which is inclined toward an outer peripheral face of the seal member is provided in the end part of the tube connecting part. According to this structure, a work for inserting the pipe connecting end can be easily conducted.

The tube connecting part in the fifth aspect of the invention is provided with a retaining ridge on its outer peripheral part, and the press-fitting member is provided with an engaging portion which is formed on an inner peripheral part of the press-fitting body and adapted to be engaged with the retaining ridge, whereby the press-fitting member is retained with respect to the tube connecting part.

The tube connecting part in the sixth aspect of the invention is provided with a rotation detent on its outer peripheral part, and the press-fitting member is provided with an engaging portion which is formed on the inner peripheral part of the press-fitting body and adapted to be engaged with the rotation detent, whereby the press-fitting member is restrained from rotating with respect to the tube connecting part.

The retaining ridge in the seventh aspect of the invention is divided in a circumferential direction for restraining the press-fitting member from rotating. According to this structure, the press-fitting member will not rotate with respect to the tube body, and hence, deterioration of the sealing performance due to the rotation of the press-fitting member with respect to the pipe connecting end will not occur.

The press-fitting member in the eighth aspect of the invention is provided with a cut-out for allowing the claw to be flexed, at an end of the press-fitting body. According to this structure, it is possible to allow the claw to be pressed into the inner wall of the pipe connecting end, by flexing the claw according to the shape of the reduced diameter part of the pipe connecting end, and a larger retaining force can be obtained.

The press-fitting member in the ninth aspect of the invention is provided with a plurality of inclined surfaces inclined at one end of an outer peripheral part of the press-fitting member along an axial direction, the one end of the outer peripheral part of the press-fitting member is formed to have a polygonal cross section with the inclined surfaces.

The inclined surfaces in the tenth aspect of the invention are provided between adjacent ones of said claws.

DETAILED DESCRIPTION OF THE PREFERRED EMBODIMENTS

Now, a mode for carrying out the invention will be described referring to an embodiment.
A First Embodiment
(1) General Structure of an Oil Feeding Device 10

Figure 1:
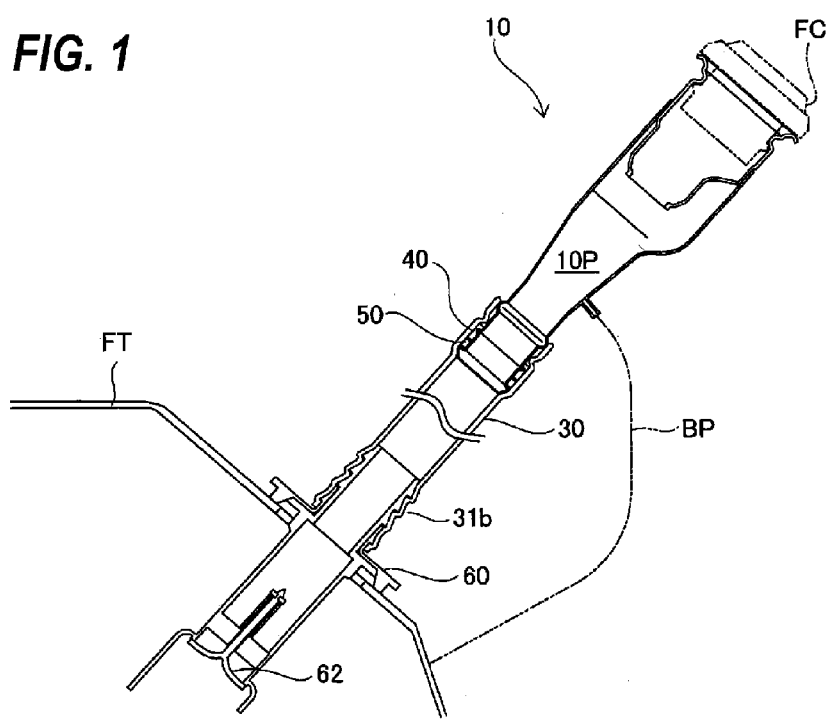
FIG. 1 is a schematic view showing an oil feeding device according to an embodiment of the invention.

FIG. 1 is a schematic view showing an oil feeding device according to an embodiment of the invention. As shown in FIG. 1, an oil feeding device 10 is provided between an inlet box (not shown) and a fuel tank FT to feed fuel which is supplied from an oil feeding gun (not shown), and includes a filler neck 20 formed of metal, a connection pipe 30 formed of resin for connecting the filler neck 20 to the fuel tank FT, a press-fitting member 40 and a seal member 50 in a form of an O-ring, for sealing and retaining a connected part between the filler neck 20 and the connection pipe 30, a tank connecting member 60 for connecting the connection pipe 30 to the fuel tank FT, a check valve 62 provided on the tank connecting member 60 for preventing backflow of the fuel and fuel vapor to be discharged to the exterior, a fuel cap FC, and a breather pipe BP for ventilating an interior of the fuel tank FT to the exterior, while feeding oil. According to this structure, by removing the fuel cap FC from the filler neck 20 at a time of feeding oil, and injecting the fuel into the filler neck 20 with the oil feeding gun, the fuel is fed to the fuel tank FT through a fuel feeding passage 10P which is composed of the filler neck 20 and the connection pipe 30. Structures of respective sections will be described below.

(2) Structures of Respective Sections.
(2)-1 The Filler Neck 20

Figure 2:
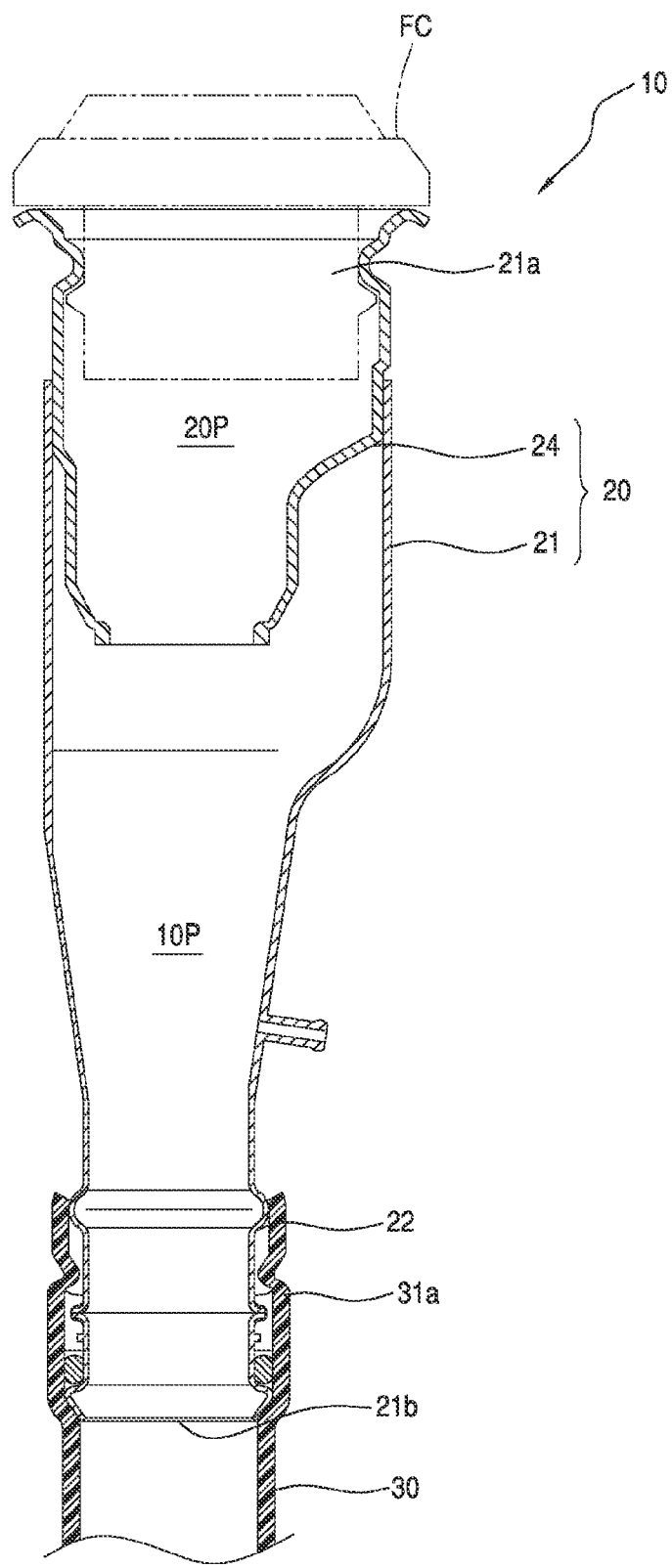
FIG. 2 is an enlarged sectional view showing a filler neck and a part of a connection pipe in FIG. 1.

FIG. 2 is an enlarged sectional view showing the filler neck 20 and a part of the connection pipe 30 in FIG. 1. The filler neck 20 is provided with a neck body 21 which constitutes an injection passage 20P, which is a part of the fuel feeding passage 10p, interconnecting an inlet 21a and an outlet 21b. A tube connecting part 22 having the outlet 21b for connecting the connection pipe 30 is formed at a lower end of the neck body 21. Moreover, a fitting metal 24 for detachably fitting the fuel cap FC is attached to an inside of the neck body 21.

Figure 3:
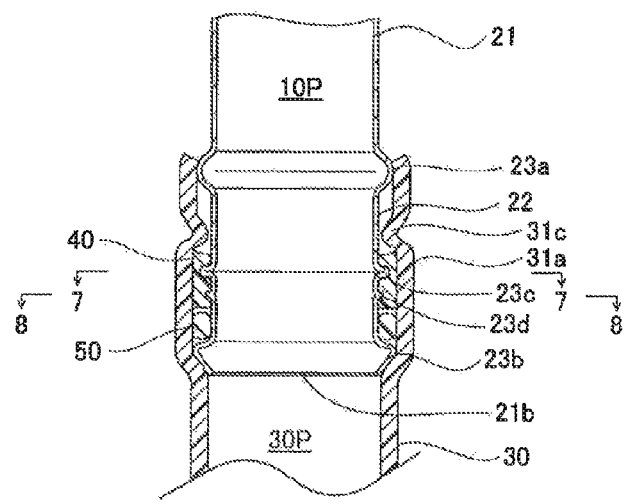
FIG. 3 is an enlarged sectional view showing an area surrounding a connected part between a tube connecting part and the connection pipe.
Figure 4:
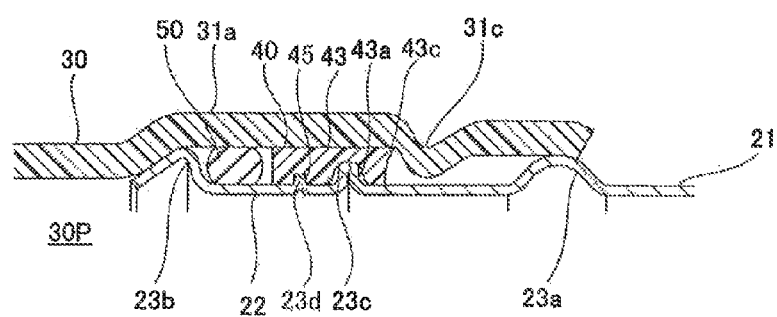
FIG. 4 is an enlarged sectional view showing an essential part of FIG. 3.
Figure 5:
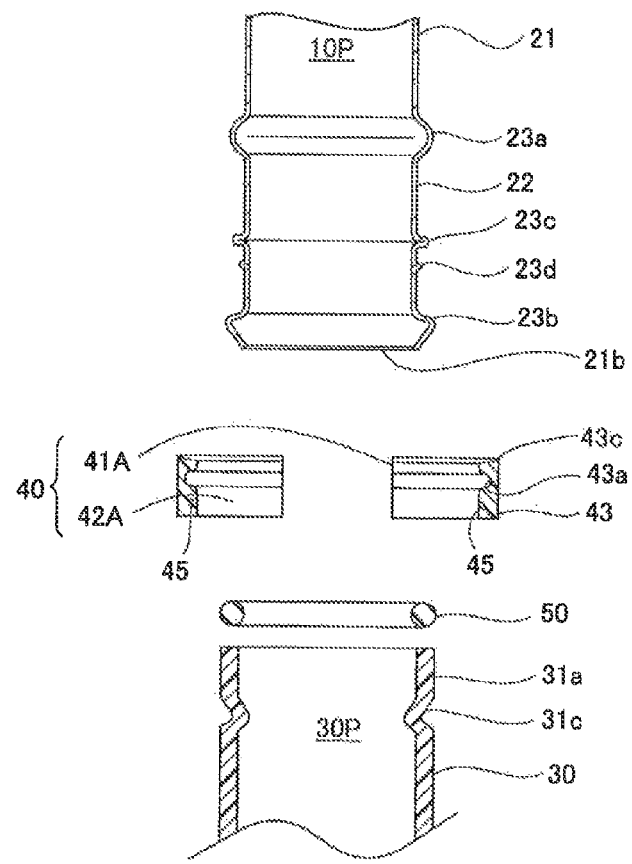
FIG. 5 is a sectional view showing the tube connecting part and the connection pipe in a state before they are connected.
Figure 7:
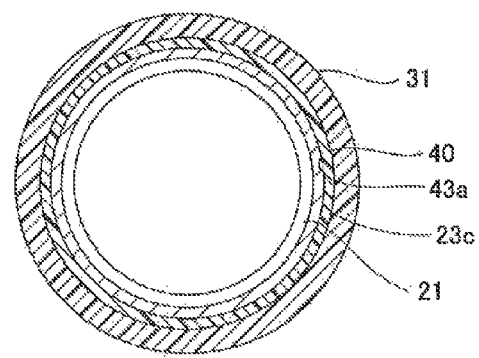
FIG. 7 is a sectional view taken along a line 7-7 in FIG. 3.
Figure 8:
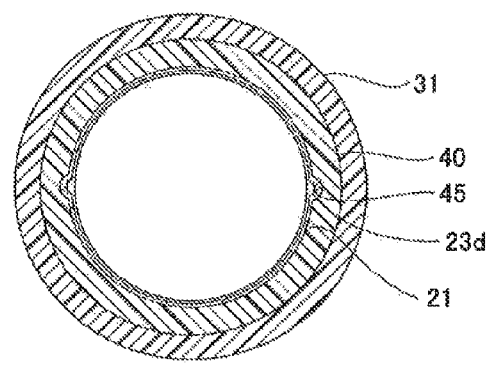
FIG. 8 is a sectional view taken along a line 8-8 in FIG. 3.

FIG. 3 is an enlarged sectional view showing an area surrounding a connected part between the tube connecting part 22 and the connection pipe 30, FIG. 4 is an enlarged sectional view showing an essential part of FIG. 3, and FIG. 5 is a sectional view showing the tube connecting part 22 and the connection pipe 30 in a state before they are connected. In FIGS. 3 to 5, an annular ridge 23a for a pipe end and an annular ridge 23b for sealing are formed on an outer peripheral part of the tube connecting part 22, by plastic work. Further, retaining ridge 23c and rotation detents 23d are formed between the annular ridge 23a for the pipe end and the annular ridge 23b for sealing. The annular ridge 23a for the pipe end is a ridge in an annular shape for preventing intrusion of sand or water from the exterior through an end of the connection pipe 30, and also for positioning the end of the connection pipe 30. The annular ridge 23b for sealing is a ridge for positioning one end of the seal member 50, and has an inclined face which is formed on an end part of the neck body 21 for facilitating an inserting work of the connection pipe 30. FIG. 7 is a sectional view taken along a line 7-7 in FIG. 3. The retaining ridge 23c is a ridge in an annular shape which is formed between the annular ridge 23a for the pipe end and the annular ridge 23b for sealing, and adapted to be engaged with the press-fitting member 40 for retaining it. FIG. 8 is a sectional view taken along a line 8-8 in FIG. 3. The rotation detents 23d, which are portions adapted to be engaged with the press-fitting member 40 for restraining it from rotating, are provided at two positions.

(2)-2 The Connection Pipe 30

In FIG. 5, the connection pipe 30 is a resin pipe for connecting the filler neck 20 to the fuel tank FT, and so formed as to be partially curved along an oil feeding passage at a bellow part (not shown). A pipe passage 30P, which is a part of the fuel feeding passage 10P, is formed inside the connection pipe 30. One end of the connection pipe 30 is formed as a pipe connecting end 31a to be connected to the filler neck 20, and the other end thereof is formed as a pipe connecting end 31b to be connected to the tank connecting member 60 (See FIG. 1) which is welded to the fuel tank FT. A reduced diameter part 31c is formed in an end part of the pipe connecting end 31a. The reduced diameter part 31c is an annular recess which is formed by reducing a diameter of the pipe connecting end 31a toward its center, and its shape is maintained in a state of plastic deformation, that is, in a state where an external force is removed. The connection pipe 30 can be produced employing resin material such as nylon 9T, by so-called corrugator, in which a parison formed of one or a plurality of layers including a barrier layer is used, and a mold is changed according to an outer shape of the bellow part or the reduced diameter part 31c, while the parison is extruded.

(2)-3 The Press-Fitting Member 40

Figure 6:
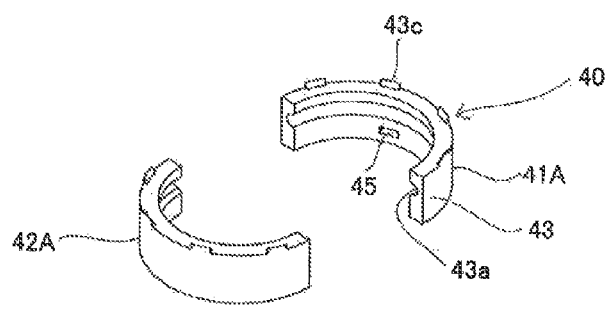
FIG. 6 is an exploded perspective view of a press-fitting member.

The press-fitting member 40 is a member formed of resin which is clamped between the tube connecting part 22 and the pipe connecting end 31a thereby to enhance sealing performance and retaining performance between the tube connecting part 22 and the connection pipe 30. FIG. 6 is an exploded perspective view of the press-fitting member 40. The press-fitting member 40 includes a press-fitting body 43 which is formed by assembling divided bodies 41A, 42A each having a semi-circular sectional shape, into an outer peripheral face of a cylindrical shape. An engaging portion 43a which is adapted to be engaged with the retaining ridge 23c of the tube connecting part 22 thereby to retain the press-fitting member 40 with respect to the tube connecting part 22 is formed on an inner periphery of the press-fitting member 43 in a form of an annular recess (See FIG. 7). Moreover, engaging portions 45 adapted to be engaged with the rotation detents 23d of the tube connecting part 22 thereby to restrain the press-fitting member 40 from rotating are formed at two positions, in a form of a recess (See FIG. 8). Further, claws 43c adapted to bite an inner wall of the pipe connecting end 31a are formed in an end part of the press-fitting member 40. The claws 43c are formed at eight positions along a circumferential direction. A lower end of the press-fitting member 40 serves as an end face for positioning the seal member 50, and positions the seal member 50 in cooperation with the annular ridge 23b for sealing. In case where the connection pipe 30 is formed of nylon 9T, the press-fitting member 40 can be formed of material having a larger coefficient of bending elasticity than nylon 9T, such as resin material containing nylon 9t mixed with glass filler, for example.

(3) Assembling Work of the Oil Feeding Device 10

After the fitting metal 24 has been attached to the neck body 21 of the filler neck 20 as shown in FIG. 2, the press-fitting member 40 is fitted to the tube connecting part 22, by assembling the divided bodies 41A and 42A (FIG. 6). On this occasion, the engaging portion 43a of the press-fitting member 40 is engaged with the retaining ridge 23c of the tube connecting part 22, and the engaging portions 45 are engaged with the rotation detents 23d of the tube connecting part 22, as shown in FIGS. 5, 7, and 8. Then, the seal member 50 is expanded in diameter, and inserted over the tube connecting part 22 from the end part thereof overstriding the annular ridge 23b for sealing, to be fitted between the annular ridge 23b for sealing and the lower end of the press-fitting member 40. Thereafter, the pipe connecting end 31a of the connection pipe 30 is moved along the inclined face of the annular ridge 23b for sealing, and press-fitted up to a position where the upper end of the press-fitting member 40 reaches the annular ridge 23a for the pipe end. On this occasion, the reduced diameter part 31c of the pipe connecting end 31a is further expanded in diameter along the inclined face of the annular ridge 23b for sealing, and further press-fitted along the outer peripheral face of the press-fitting member 40. In this manner, the pipe connecting end 31a of the connection pipe 30 is connected to the tube connecting part 22 of the filler neck 20 by means of the press-fitting member 40 and the seal member 50.

(4) Operation and Effects of the Embodiment

According to the structure as described above, the following effects can be attained in addition to the above described effects.

(4)-1 The claws 43c of the press-fitting member 40 are engaged with the reduced diameter part 31c which is formed by reducing a diameter of a part of the pipe connecting end 31a thereby to retain the pipe connecting end 31a. Therefore, a large retaining load can be obtained, even though soft resin material is not employed as the resin material for the connection pipe 30, as described in the prior art. As the results, various resin materials can be applied to the connection pipe 30, and versatility can be enhanced.

(4)-2 By adequately modifying shapes of the reduced diameter part 31c of the pipe connecting end 31a and the claws 43c of the press-fitting member 40, specifically, by changing an angle of the claws 43c to be butted against the reduced diameter part 31c, or a size of the claws 43c, and so on, an engaged state between them can be varied. In this manner, the retaining load can be easily set at an optimal value.

(4)-3 The press-fitting member 40 is formed of resin, and hence, it is possible to form the claws 43c and the end faces more acute, at a right angle or so, than in the filler neck 20 formed of metal. Therefore, the acute claws 43c bite the inner wall of the pipe connecting end 31a, which contributes to enhanced retaining performance for preventing the pipe connecting end 31a from being withdrawn from the press-fitting member 40.

(4)-4 The outer peripheral face of the press-fitting body 43 of the press-fitting member 40 is a smooth face in a cylindrical shape, and a large force is not required for the connection pipe to overstride the annular ridge, unlike the annular ridge having an acute angle which is formed on the outer peripheral part of the connection member as described in the prior art. In this manner, connecting workability is enhanced.

(4)-5 The reduced diameter part 31c which is formed on the pipe connecting end 31a can be easily formed before connection, by crimping with heat or by extrusion molding.

(4)-6 A plurality of the claws 43c of the press-fitting member 40 also function as rotation detents for the pipe connecting end 31a, because they bite the inner wall of the reduced diameter part 31c of the pipe connecting end 31a.

(4)-7 The press-fitting member 40 is unlikely to be withdrawn, even though a force is applied in a direction of withdrawing the connection pipe 30, since its engaging portion 43a is engaged with the retaining ridge 23c of the tube connecting part 22. Moreover, the press-fitting member 40 is restrained from rotating with respect to the tube connecting part 22, since its engaging portions 45 are engaged with the rotation detents 23d of the tube connecting part 22. Therefore, decrease of the sealing performance due to rotation of the pipe connecting end 31a of the connection pipe 30 and so on will not be incurred.

(4)-8 The press-fitting member 40 is formed by assembling the divided bodies 41A, 42A having a semicircular sectional shape which are divided in an axial direction of the press-fitting member 40. Therefore, it is possible to easily fit the press-fitting member 40 to the tube connecting part 22, even though the annular ridge 23*a* for the pipe end is provided on the outer peripheral part of the tube connecting part 22.

(4)-9 The seal member 50 is positioned between the annular ridge 23*b* for sealing of the tube connecting part 22 and the end face of the press-fitting member 40 formed of resin. Because the one end of the fitting member 40 can be easily molded as a vertically erected end face, a compression range of the seal member 50 is limited to a desired extent, and desired allowance and sealing performance can be secured, even though the annular ridge 23*b* for sealing of the tube connecting part 22 formed of metal has an obtuse inclined face.

(5) Other Embodiments

This invention is not limited to the above described embodiment, but can be also carried out in various modes within a scope not deviating from gist of the invention. For example, the following modifications can be made.

Figure 9:
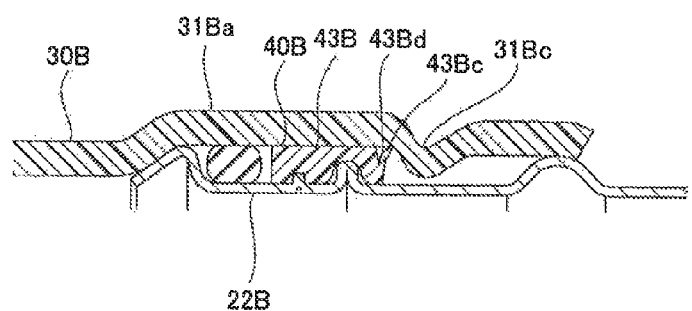
FIG. 9 is a sectional view showing a connected part between a tube connecting part and a connection pipe according to another embodiment.

(5)-1 FIG. 9 is a sectional view showing a connected part between a tube connecting part 22B and a connection pipe 30B according to another embodiment. This embodiment is characterized in a shape of a claw 43Bc of a press-fitting member 40B. Specifically, a cut-out 43Bd is formed near the claw 43Bc of the press-fitting body 43B. When a force is applied to the connection pipe 30B in a withdrawing direction, the cut-out 43Bd allows the claw 43Bc to be flexed so that the claw 43Bc can be easily engaged with the reduced diameter part 31 Bc of the pipe connecting end 31Ba, whereby a withdrawing load is enhanced.

Figure 10:
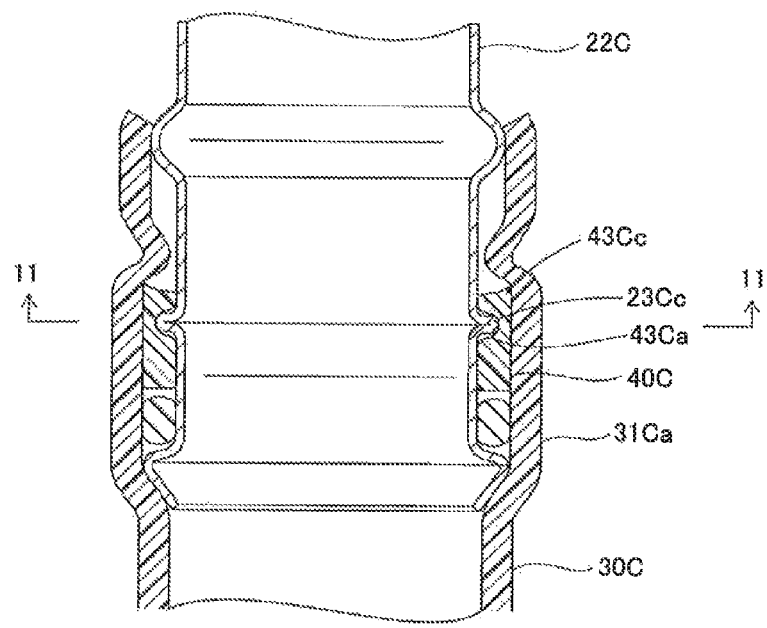
FIG. 10 is a sectional view showing a connected part between a tube connecting part and a connection pipe according to still another embodiment.
Figure 11:
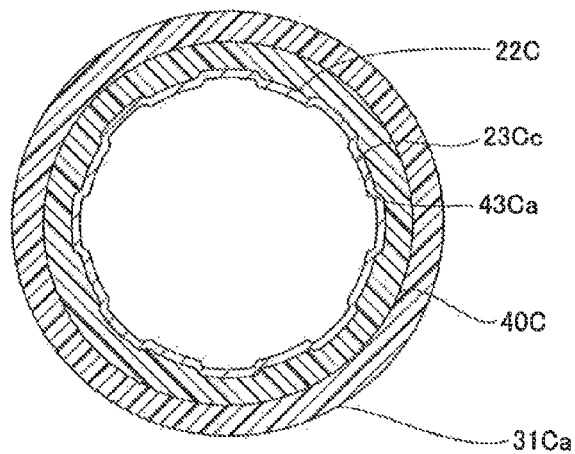
FIG. 11 is a sectional view taken along a line 11-11 in FIG. 10.

(5)-2 FIG. 10 is a sectional view showing a connected part between a tube connecting part 22C and a connection pipe 30C according to still another embodiment, and FIG. 11 is a sectional view taken along a line 11-11 in FIG. 10. This embodiment is characterized in structure of a retaining projection 23Cc of the tube connecting part 22C. Specifically, the retaining projection 23Cc is not an annular ridge having an equal diameter in a circumferential direction, but composed of a plurality of retaining projections 23Cc provided in the circumferential direction. Moreover, engaging portions 43Ca are also formed on a press-fitting member 40C partially in a form of recess, corresponding to a concave-convex shape of the retaining projections 23Cc. According to this structure, the press-fitting member 40C is restrained from rotating with respect to a pipe connecting end 31Ca. Moreover, claws 43Cc which are partially formed may be also used, in combination, as a rotation detent mechanism of the press-fitting member 40C.

(5)-3 In the above described embodiment, a step for forming the reduced diameter part by plastically deforming a part of the pipe connecting end is conducted when the resin pipe is produced. However, the step is not limited to this case, but can be conducted either before or after the connection. Specifically, the reduced diameter part may be formed by caulking with heat from the outer peripheral part of the pipe connecting end before the connection, or may be formed by caulking with heat from the outer peripheral part of the pipe connecting end after the connection. Moreover, the reduced diameter part may be formed over the entire circumference or a part of the circumference, provided that the reduced diameter part functions as retaining means with respect to the claws of the press-fitting member.

(5)-4 In the above described embodiment, the invention is applied to the connection between the inlet pipe and the connection pipe in the oil feeding device for feeding fuel to a fuel tank of an automobile. However, the invention is not limited to the case, but can be applied to tubing systems of various types, provided that a tube body formed of metal is connected to a connection pipe formed of resin, employing the connecting structure.

Figure 12:
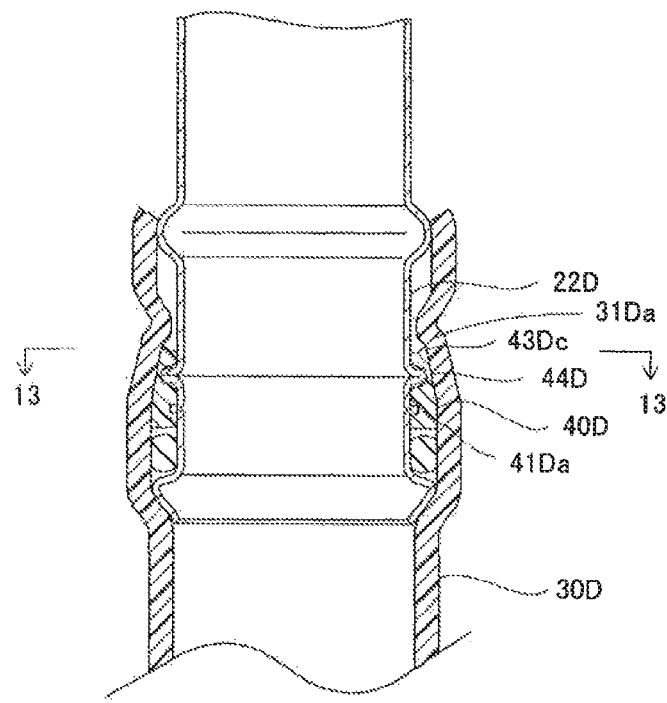
FIG. 12 is a sectional view showing a connected part between a tube connecting part and a connection pipe according to another embodiment.
Figure 13:
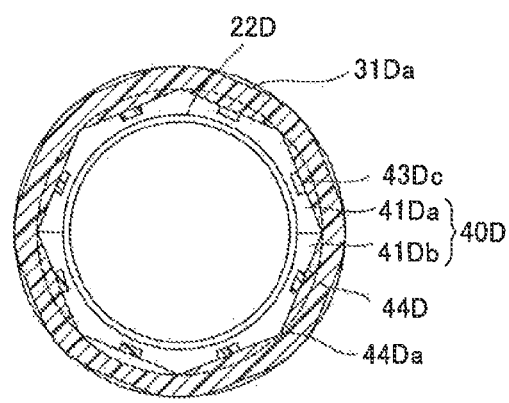
FIG. 13 is a sectional view taken along a line 13-13 in FIG. 12.
Figure 14:
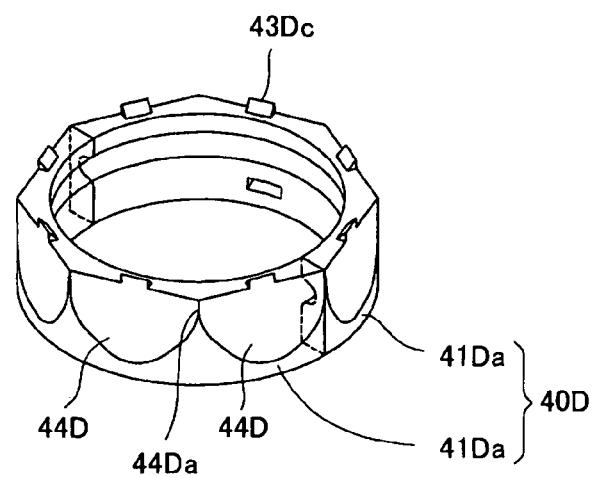
FIG. 14 is a perspective view of a press-fitting member.

FIG. 12 is a sectional view showing a connected part between a tube connecting part 22D and a connection pipe 30D according to still another embodiment, FIG. 13 is a sectional view taken along a line 13-13 in FIG. 12, and FIG. 14 is a perspective view showing a press-fitting member 40D. This embodiment is characterized in structure of rotation detent of the press-fitting member 40D. In FIG. 14, the press-fitting member 40D is constituted by a tube body formed by assembling divided bodies 41Da, 41Db. On a side of one end of the tube body, which is on the side where the claw 43Dc is formed, is provided with a plurality of inclined surfaces 44D. The inclined surfaces 44D are provided by cutting off parts of the press-fitting member 44D at eight positions along the one end of the outer circumference of the press-fitting member 40D with a predetermined angle in the axial direction forming an outer circumferential shape to have a polygonal cross section (octagon in cross section in the figure). Ridge-like projections 44Da are provided between the adjacent inclined surfaces 44D. The inclined surfaces 44D do not reach at the other end of the tube body, so that the outer circumference of the press-fitting member 40D has a circular cross section. According to the foregoing structure, as shown in FIG. 13, the projections 44Da formed between the inclined surfaces 44D of the press-fitting member 40D are pressed into an inner wall of the pipe connecting end, so that the press-fitting member 40D restrains the pipe connecting end 31Da from rotating in cooperation with claws 43Dc. Further, since the outer circumference of the other end of the press-fitting member 40D has the circular cross section, the pipe connecting end 31Da of the connection pipe 30D is not interfered with other members during insertion of the connection pipe 30D.

In the present embodiment, the inclined surfaces are provided to form the octagon shape at the outer circumference at the one end of the press-fitting member. The invention is not limited to this construction, and the inclined surfaces may be provided to form other types of polygonal shapes in view of sealing performance and effect of rotation dent effect and may be provided only at a part of the outer circumference. The above structure can be applied in a suitable manner to the other embodiments in the present application.

Figure 15:
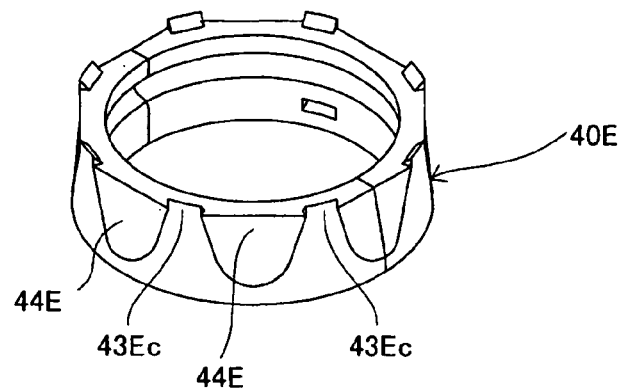
FIG. 15 is a perspective view showing a press-fitting member according to a modification of the embodiment of FIG. 14.

FIG. 15 is a perspective view showing a press-fitting member 40E according to a modification of the embodiment of FIG. 14. This modification is characterized by the arrangement of inclined surfaces 44E and claws 43Ec of a press fitting member 40E. Inclined surfaces 44E are arranged between adjacent ones of claws 43Ec. In this construction, similarly to the embodiment shown in FIG. 9, the claws 43Ec enable to secure a high pull-off tensile load, by forming a relatively large angle with respect to the reduced diameter part of the pipe connecting end that is larger than that of the embodiment of FIG. 12. Further, insertion operation of the connection pipe can be facilitated by forming outer peripheral surfaces of the claws 43Ec to be arc shapes that are coincided with the outer circumference of the press fitting member 40E.

What is claimed is:

1. A connecting structure, comprising:
    a tube body made of metal and having a tube connecting part, the tube connecting part having an annular ridge with an inclined surface for sealing,
    a connection pipe made of resin having a pipe connecting end, the tube connecting part being inserted into the connection pipe, and the pipe connecting end covering the tube connecting part, a press-fitting member having a tube shape being clamped between the tube connecting part and the pipe connecting end,
a seal member that is positioned at one end of the press-fitting member and interposed between the pipe connecting end and the tube connecting part for sealing, wherein
the press-fitting member consists essentially of a resin material and is arranged between an outer peripheral part of the tube connecting part and an inner wall of the pipe connecting end, the press-fitting member including a press-fitting body having:
  claws arranged at one end of the press-fitting body and at a plurality of positions in a circumferential direction of the press-fitting member, each of the claws having a first smooth outer annular surface extending in an axial direction of the press-fitting member and at a constant radial distance from an axis of the press-fitting member, and
  a cylindrical outer peripheral face having a second smooth outer annular surface extending in the axial direction of the press-fitting member and at the constant radial distance of the first smooth outer annular surface and being flush with the first smooth outer annular surface of the claws,
the press-fitting member being press-fit onto the outer peripheral part of the tube connecting part and the claws biting an inner wall of the pipe connecting end,
the pipe connecting end includes a reduced diameter part with an annularly reduced diameter relative to other parts of the pipe connecting end, the reduced diameter part of the pipe connecting end having a structure and being arranged to retain the pipe connecting end in engagement with the claws of the press-fitting member,
the tube connecting a part has an outer peripheral part with an annular retaining ridge and at least one rotational detent including an outwardly radially extending protrusion
the press-fitting member has an inner peripheral part with an annular engaging portion and at least one engaging detent portion including a hole having a shape corresponding to the shape of the outwardly radially extending protrusion,
the annular engaging portion of the press-fitting body engages the annular retaining ridge of the tube connecting part, engagement of the annular engaging portion of the press-fitting member with the annular retaining ridge of the tube connecting part prevents axial movement of the press-fitting member with respect to the tube connecting part, and
the at least one engaging detent portion of the press-fitting body engages the at least one rotation detent of the tube connecting part, and engagement of the at least one engaging detent portion of the press-fitting member and the at least one rotation detent of the tube connecting part prevents rotation of the press-fitting member with respect to the tube connecting part.

2. The connecting structure as claimed in claim 1, wherein the claws extend in an axial direction of the press fitting member and are pressed into an inner wall of the reduced diameter part and restrain the pipe connecting end from rotating.

3. The connecting structure as claimed in claim 1, wherein the press-fitting member comprises divided bodies having a semi-circular sectional shape that are assembled together to form a unified press-retaining member, the divided bodies being divided into the semi-circular sectional shape along an axial direction of the press-fitting member.

4. The connecting structure as claimed in claim 1, wherein one end of the seal member is positioned in an end part of the tube connecting part, and the one end of the seal member is adjacent the annular ridge having the inclined face inclined toward an outer peripheral face of the seal member that is provided in the end part of the tube connecting part.

5. The connecting structure as claimed in claim 1, wherein a lower end of the press-fitting member has an end face for positioning the seal member.

6. The connecting structure as claimed in claim 1, wherein the seal member comprises an O-ring.

7. The connecting structure as claimed in claim 1, wherein the seal member is positioned adjacent the inclined surface of the annular ridge of the connecting part.

8. The connecting structure as claimed in claim 1, wherein the seal member comprises an O-ring that is positioned adjacent the inclined surface of the annular ridge of the connecting part.

9. A connecting structure as claimed in claim 1, wherein the connecting structure is a connecting structure for an oil feeding device for feeding fuel.

10. An oil feeding device for feeding fuel comprising the connecting structure as claimed in claim 1.

* * * * *